(12) United States Patent
Dubey et al.

(10) Patent No.: US 6,282,628 B1
(45) Date of Patent: Aug. 28, 2001

(54) METHOD AND SYSTEM FOR A RESULT CODE FOR A SINGLE-INSTRUCTION MULTIPLE-DATA PREDICATE COMPARE OPERATION

(75) Inventors: Pradeep Kumar Dubey, New Delhi (IN); Brett Olsson, Cary, NC (US); Ronald Ray Hochsprung, Los Gatos, CA (US); Hunter Ledbetter Scales, III, Austin, TX (US); Keith Everett Diefendorff, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,374

(22) Filed: Feb. 24, 1999

(51) Int. Cl.[7] ........................................ G06F 15/80
(52) U.S. Cl. .......................... 712/22; 712/221; 712/234
(58) Field of Search ............................ 712/221, 2, 208, 712/22, 234

(56) References Cited

U.S. PATENT DOCUMENTS 4,630,192 * 12/1986 Vassel et al. ........................ 712/221
5,745,721 * 4/1998 Beard et al. ........................ 712/208
5,864,703 * 1/1999 Van Hook et al. .................. 712/22
5,887,183 * 3/1999 Agarwal et al. ..................... 712/2
5,933,650 * 8/1999 Van Hook et al. .................. 712/2

* cited by examiner

Primary Examiner—Meng-Al T. An
Assistant Examiner—Jungwon Chang
(74) Attorney, Agent, or Firm—Casimer K. Salys; Bracewell & Patterson L.L.P.

(57) ABSTRACT

A method and system is disclosed which summarizes the results of a classical single-instruction multiple-data SIMD predicate comparison operation, signaling whether all comparisons resulted in a false result or true result, and placing that status into a separate status register, such as the Power PC Condition Register. The method and system utilizes first and second status bits to support the signaling whether all element comparisons resulted in true or false. The first status bit is set when all element comparisons resulted in false (i.e. a NOR of all predicate comparison results), and the second status bit is set when all element comparisons resulted in true (i.e. an AND of all predicate comparison results). This capability allows control flow using conditional branching on the event when all comparison results are false or when all comparison results are true. The method and system of the present invention is useful in 3-D graphics such as lighting and trivial acceptance testing where executing down both paths of a branch and then selecting the correct result is not tolerable.

20 Claims, 6 Drawing Sheets

METHOD AND SYSTEM FOR A RESULT CODE FOR A SINGLE-INSTRUCTION MULTIPLE-DATA PREDICATE COMPARE OPERATION

BACKGROUND OF THE INVENTION

1. Technical Field

The present invention relates to a method and system for data processing or information handling systems in general and, in particular, to a method and system for processing vector data in a computer system. Still more particularly, the present invention relates to a method and system for producing a two-bit code result when performing a single instruction multiple data (SIMD) predicate compare operation in three-dimensional graphic operations.

2. Description of the Prior Art

Applications of modern computer systems are requiring greater speed and data handling capabilities for uses such as multimedia and scientific modeling. For example, multimedia systems generally are designed to perform video and audio data compression, decompression, and high-performance manipulation such as three-dimensional imaging and graphics. Three-dimensional imaging and graphics require massive data manipulation and an extraordinary amount of high-performance arithmetic and vector-matrix operations. One such operation is the classical single-instruction multiple-data (SIMD) predicate comparison operation which involves comparing the contents of two vector registers, element by element, for a specific predicate (e.g. is greater than, is less than or is equal to) in producing three-dimensional graphics. For each element the result of the comparison (true or false) is placed in the respective element of a target vector register. The control flow for this type of operation is typically handled in parallelism by executing the operations on all paths of a branch and saving the results in separate registers. A mask or set of masks is then generated based on the condition of the branch wherein the mask(s) are used to perform an element-by-element select between the possible results. This procedure works well for loop-based data parallelism and is efficiently supported using single-instruction multiple-data (SIMD) predicate comparison operations.

However, there are cases when data-driven control flow in instruction sequencing controlled by the results of operations on data is needed to accommodate the occurrence of special events, where specialized data handling is needed in the presence of these events. These special events could manifest themselves in a single element, across all elements, or in no elements at all in a single-instruction multiple-data (SIMD) predicate comparison operation. Additionally, these special events may severely reduce or even eliminate the use of SIMD parallelism. Therefore, there is a need for a method and system that allows control flow using conditional branching on the special event when all comparisons are false or when all predicate comparison results are true. The subject invention herein solves this problem in a new and unique manner that has not been part of the art previously.

SUMMARY OF THE INVENTION

In view of the foregoing, it is therefore an object of the present invention to provide an improved method and system for performing single-instruction multiple-data (SIMD) predicate compare operations in a computer system or information handling system.

It is another object of the present invention to provide an improved method and system when performing a single-instruction multiple-data (SIMD) predicate compare operation that produces a two-bit code result for use in three-dimensional graphic operations when generating three-dimensional images and graphics in a computer system or information handling system.

The foregoing objects are achieved as is now described. The present invention summarizes the results of a classical single-instruction multiple-data SIMD predicate comparison operation, signaling whether all predicate comparisons resulted in a false result or true result, and placing that status into a separate status register, such as the Power PC Condition Register. The method and system utilizes first and second status bits to support the signaling whether all element predicate comparisons resulted in true or false. The first status bit is set when all element predicate comparisons resulted in false (i.e. a NOR of all predicate comparison results), and the second status bit is set when all element predicate comparisons resulted in true (i.e. an AND of all predicate comparison results). This capability allows control flow using conditional branching on the event when all predicate comparison results are false or when all predicate comparison results are true. The method and system of the present invention is useful in 3-D graphics such as lighting and trivial acceptance testing where executing down both paths of a branch and then selecting the correct result is not tolerable.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
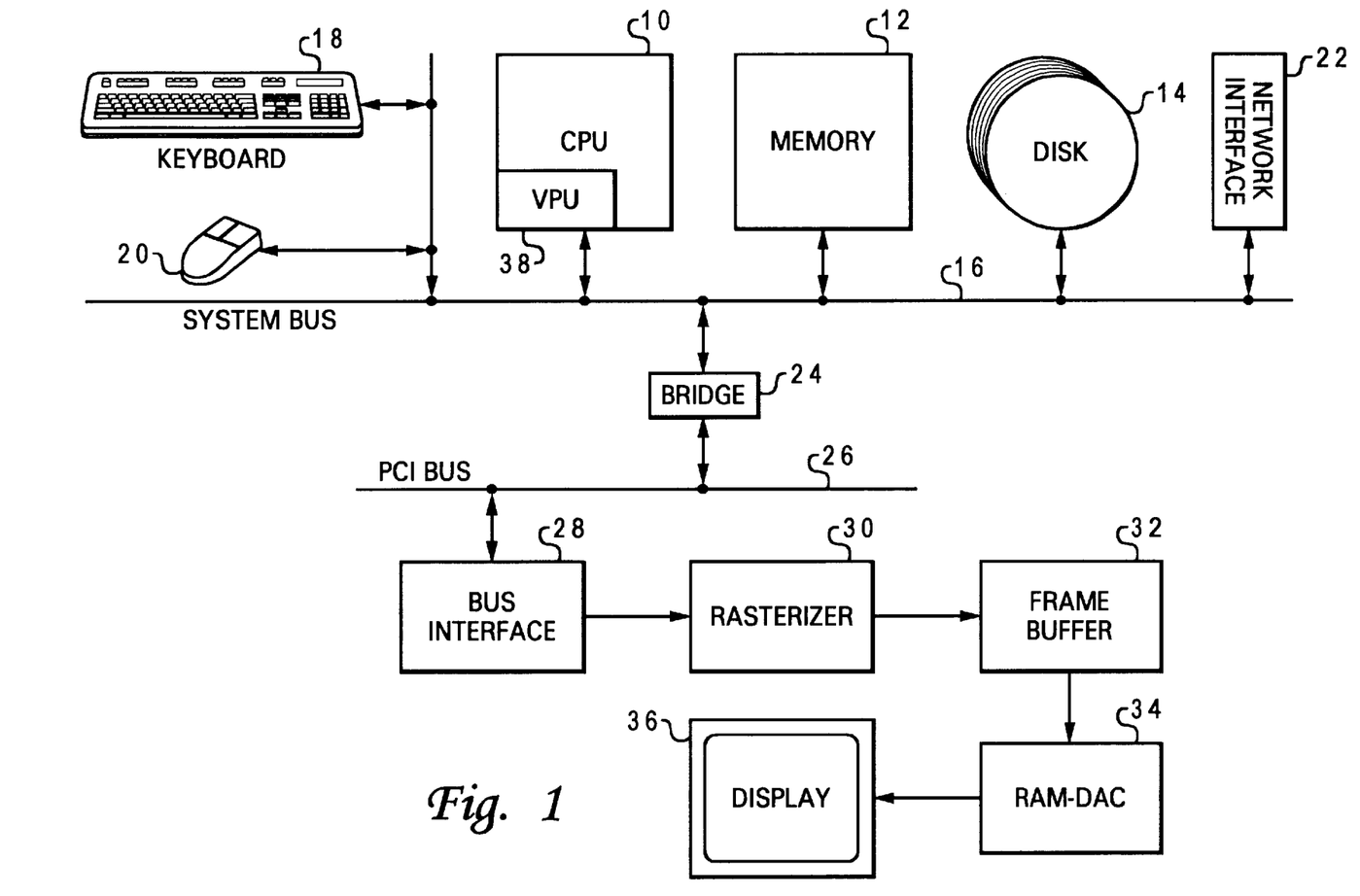
FIG. 1 is a system block diagram of a computer system, which may be utilized in conjunction with a preferred embodiment of the present invention.

The present invention may be executed in a variety of computer systems under a number of different operating systems or information handling systems. Referring now to the drawings and in particular to FIG. 1, there is depicted a system block diagram of a computer system which has a graphics display output that may utilize the single-instruction multiple-data (SIMD) predicate compare feature of the invention. The computer system includes a CPU 10, main (physical) memory 12, and disk storage 14, interconnected by a system bus 16. Other peripherals such as a keyboard 18, mouse 20, and adapter card 22 for interface to a network are included in the computer system. The graphics subsystem is connected to the CPU and memory via a bridge 24 and PCI bus 26. This is just an example of one embodiment of a computer system and bus arrangement; features of the invention may be used in various system configurations.

The graphics subsystem includes a bus interface chip 28 connected to the PCI bus 26 to handle transfer of commands and data from the CPU and memory to the graphics subsystem. A rasterizer 30 generates pixel data for a bit-mapped image of the screen to be displayed, for storing in a frame buffer 32. The data stored in the frame buffer is read out via a RAMDAC or RAM and digital-to-analog converter 34 to a CRT display 36, for each screen update. Referring once again to FIG. 1, formed within the integrated circuitry of the CPU 10 is an execution unit for vector processing shown as VPU 38. VPU 38 performs vector-oriented operations for performing three-dimensional graphics using operands received from processing registers not shown in accordance with a preferred embodiment of the present invention.

Figure 2:
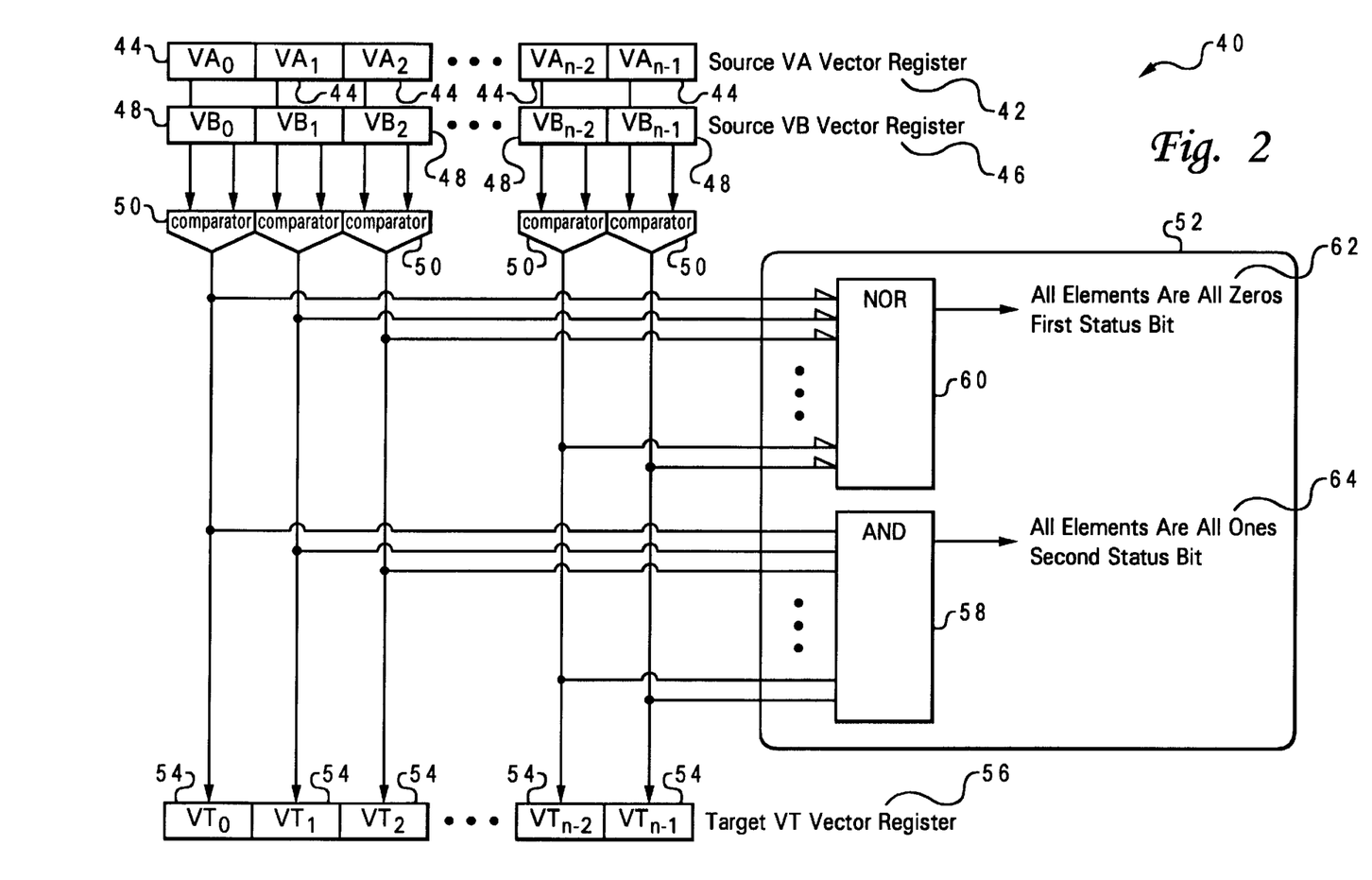
FIG. 2 is a high level block diagram illustrating the data flow in accordance with the teachings of this invention.

Referring now to FIG. 2, there is shown a high-level block diagram 40 illustrating the data flow in accordance with the teachings of the present invention. The method of the present invention provides a result code 52 for a specified single-instruction multiple-data predicate compare using a first vector register VA 42 having one or more elements, $VA_0$ through $VA_{n-1}$ 44 and a second vector register VB 46 having one or more elements, $VB_0$ through $VB_{n-1}$ 48. Referring to FIG. 2, elements $VA_0$ through $V_{n-1}$ 44 are inputted into predicate comparators 50 on a one-to-one element by element basis and compared to elements, $VB_0$ through $VB_{n-1}$ 48. The result for each element by element predicate comparison is then placed into their respective elements $VT_0$ through $VT_{n-1}$ 54 in a target vector register VT 56. In accordance with the preferred embodiment of the present invention, the result for each element by element predicate comparison is also inputted into "all ones" detect logic (i.e. AND gate) 58 and into "all zeros" detect logic (i.e. NOR gate) 60.

Referring once again to FIG. 2, summarizing a specified single-instruction multiple-data predicate compare operation produces a two status bit result 52 having a first status bit 62 and a second status bit 64. The first status bit 62 result is set when the entire element by element predicate comparisons inputted into the "NOR" gate are all zeros indicating a false result. The second status bit 64 is set when the entire element by element predicate comparisons inputted into an "AND" gate are all ones indicating a true result. The above-described process may be implemented using the PowerPC instruction set architecture used in association with the PowerPC™ family of processors available from International Business Machines of Armonk, N.Y. Additionally, the two status bit result may be stored in a status register such as the PowerPC Condition Register for supporting control flow (i.e. conditionally branch based on the result) after performing a specified single-instruction multiple-data predicate compare operation.

Figure 3:
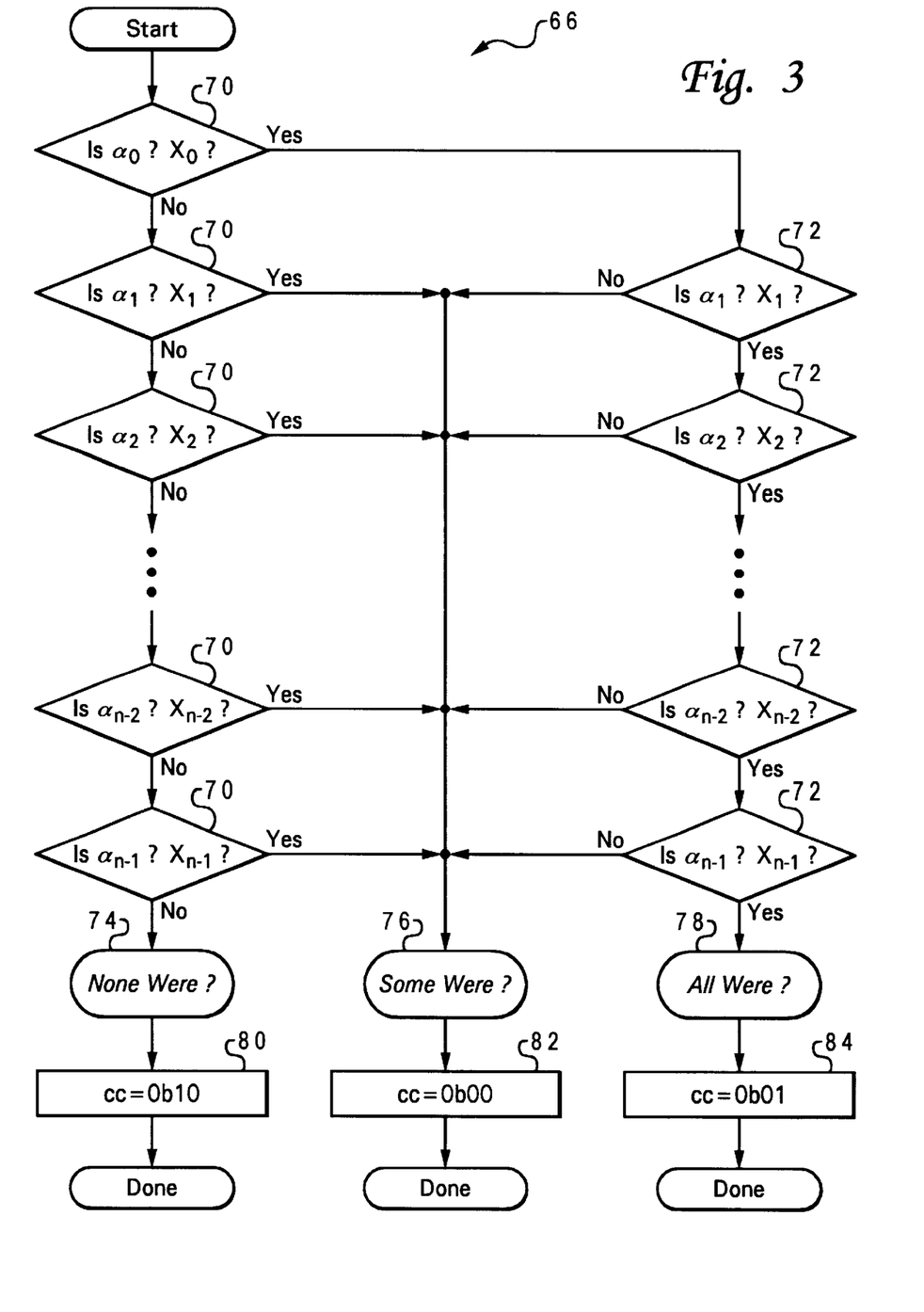
FIG. 3 is a logic flow diagram of a method for performing a two-bit result code for a vector predicate compare operation shown in FIG. 2.

Referring now to FIG. 3, there is depicted a logic flow diagram 66 for the method of the present invention for producing a two-bit result code for any general single-instruction multiple-data predicate compare operation. As shown in FIG. 3, the elements of the first vector 42 is represented as $\alpha_0$ through $\alpha_{n-1}$ 44 and the elements of the second vector 48 is represented by elements $X_0$ through $X_{n-1}$. Each decision block, 70 and 72 shows performing on an element by element basis any specified single-instruction multiple-data (SIMD) predicate compare operation (represented by the "?" sign). Referring once again to FIG. 3, if the result for all the decision blocks 70 are no, then none of the element by element predicate comparison satisfies the predicate compare operation, as shown in block 74. A two status bit result is expressed in block 80 for this case as a two bit digital representation "0b10". If the result for all the decision blocks for both 70 and 72 are yes, then the entire element by element predicate comparison satisfies the predicate compare operation, as shown in block 78. A two status bit result is expressed in block 84 for this case as a two bit digital representation "0b01". If the result for some of the decision blocks 70 is yes and some of the decision blocks 72 are no, then some of the element by element predicate comparison satisfies the predicate compare operation, as shown in block 76. A two status bit result is expressed in block 82 for this case as a two bit digital representation "0b00".

Figure 4:
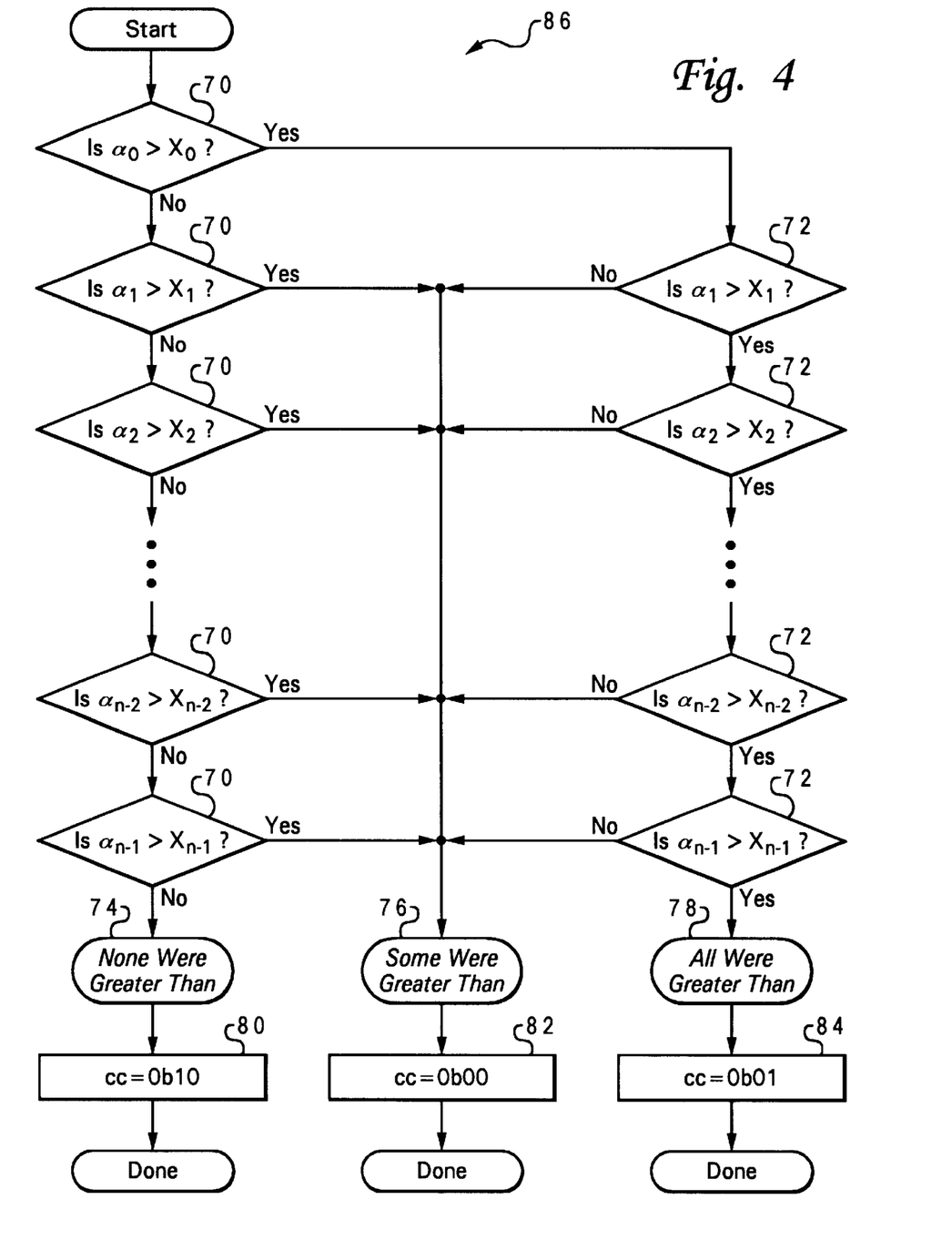
FIG. 4 is a logic flow diagram of a method for performing a two-bit result code for a vector predicate compare greater than operation shown in FIG. 2.
Figure 5:
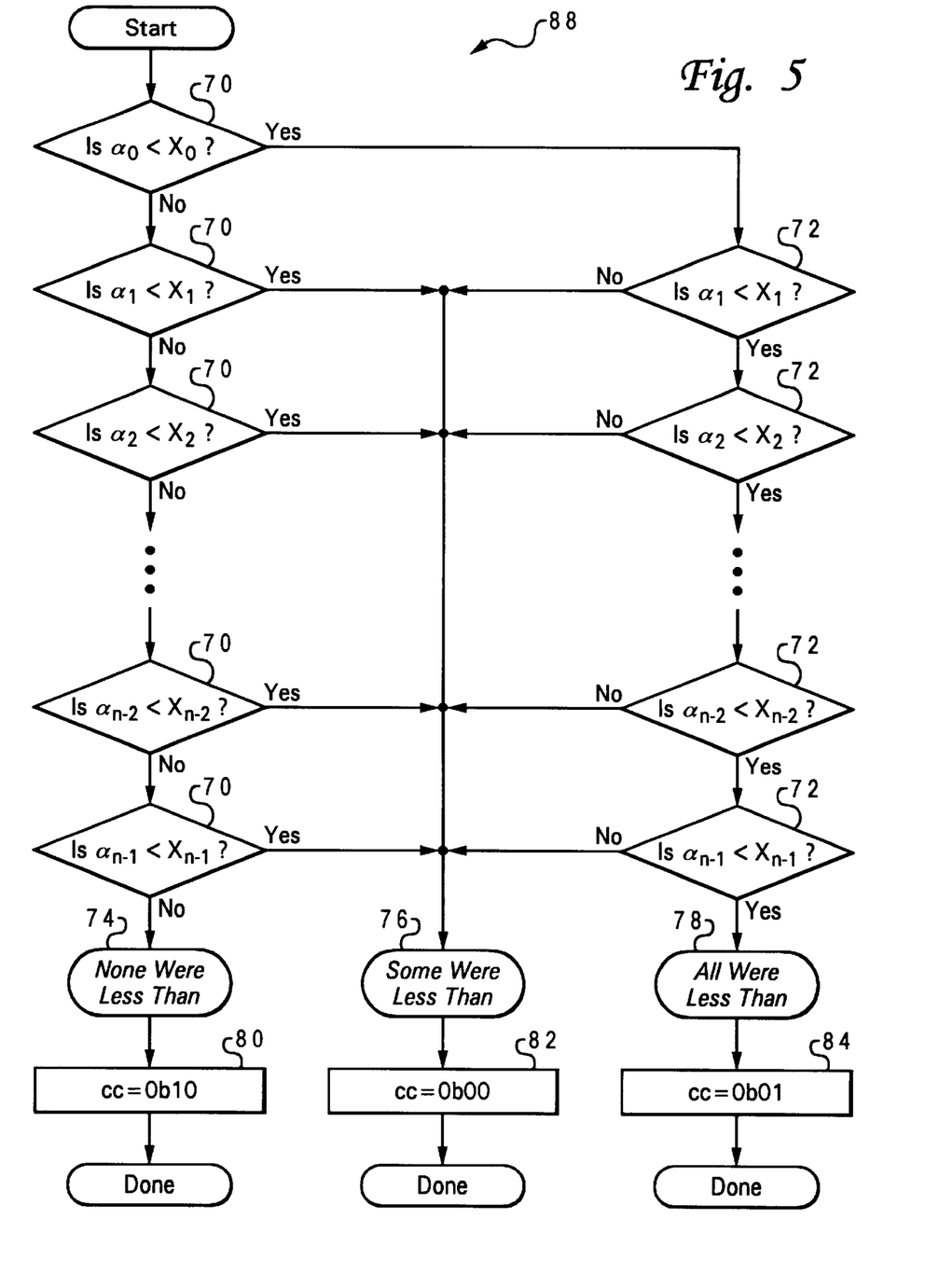
FIG. 5 is a logic flow diagram of a method for performing a two-bit result code for a vector predicate compare less than operation shown in FIG. 2.
Figure 6:
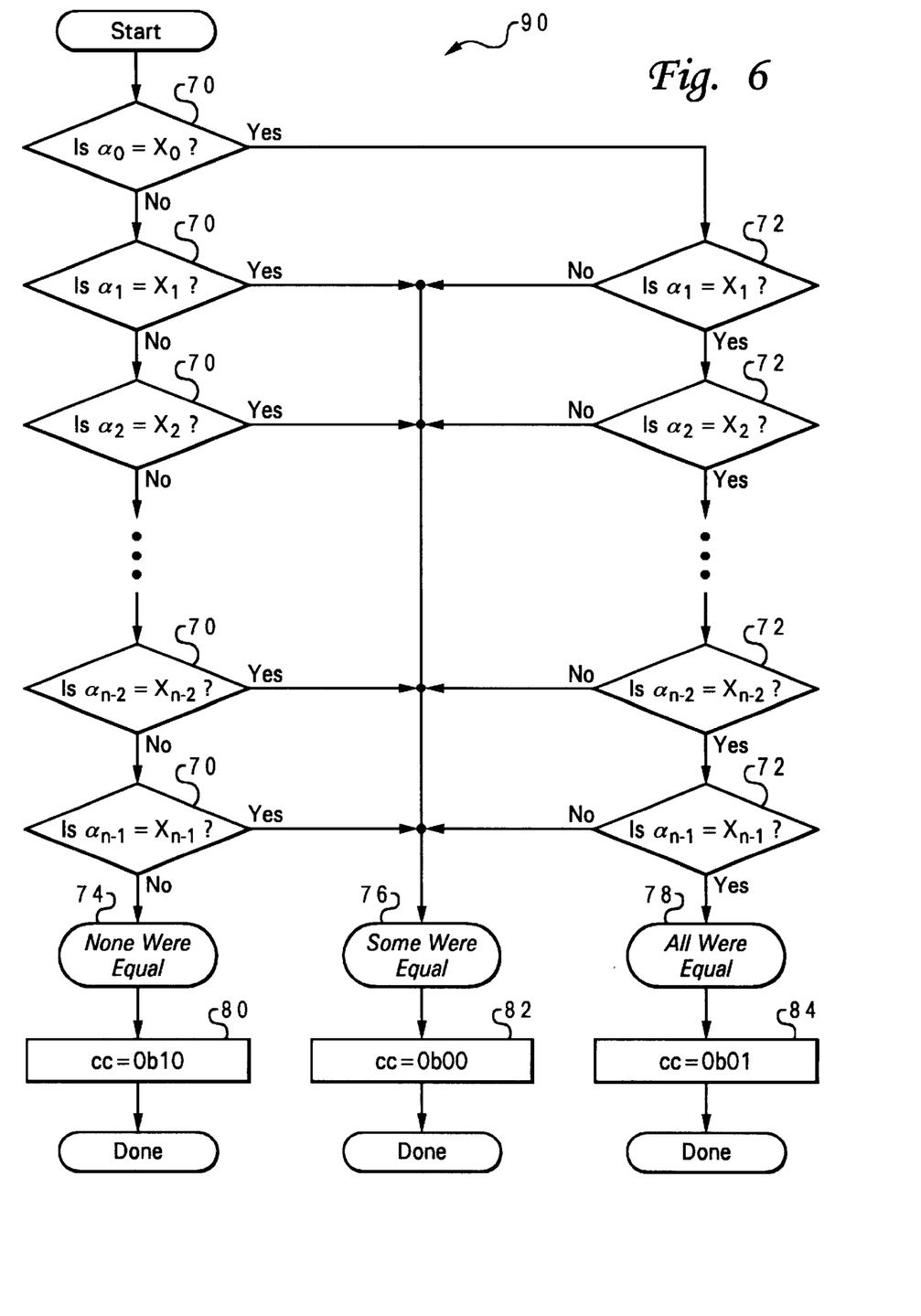
FIG. 6 is a logic flow diagram of a method for performing a two-bit result code for a vector predicate compare equal to operation shown in FIG. 2.

Referring now to FIGS. 4, 5 and 6, there is depicted logic flow diagrams 86, 88 and 90 for producing a two-bit result code for single-instruction multiple-data predicate compare operations comprising of the group, is greater than, is less than and is equal to. As shown in FIGS. 4, 5 and 6, the elements of the first vector 42 is represented once again as $\alpha_0$ through $\alpha_{n-1}$ 44 and the elements of the second vector 48 is represented once again by elements $X_0$ through $X_{n-1}$. Each decision block, 70 and 72 shows performing on an element by element basis operations comprising of the group, is greater than, is less than and is equal to (represented by the ">", "<" and "=" signs). Referring once again to FIGS. 4, 5 and 6, if the result for all the decision blocks 70 are no, then none of the element by element predicate comparison satisfies that particular predicate compare operation performed, as shown in block 74. Once again, a two status bit result is expressed in block 80 for this case as a two bit digital representation "0b10". If the result for all the decision blocks for both 70 and 72 are yes, then the entire element by element predicate comparison satisfies that particular predicate compare operation, as shown in block 78. Similarly as before, a two status bit result is expressed in block 84 for this case as a two bit digital representation "0b01". If the result for some of the decision blocks 70 is yes and some of the decision blocks 72 are no, then some of the element by element predicate comparison satisfies the particular predicate compare operation, as shown in block 76. A two status bit result is expressed in block 82 for this case as a two bit digital representation "0b00".

The present invention provides a method and system that allows greater control flow using conditional branching on special events when performing single-instruction multiple-data (SIMD) predicate compare operations. More particularly, when performing element by element predicate comparison, expeditiously indicating when all comparisons are false or when all comparison results are true. Classical SIMD architectures do not support control flow based on a SIMD predicate comparison in such a manner. The method and system is therefore useful in 3-D graphics such as lighting and trivial acceptance testing where executing down both paths of a branch and then selecting the correct result is not tolerable.

It is also important to note that although the present invention has been described in the context of a fully providing a result code for a single-instruction multiple-data predicate compare operation, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing a result code for a single-instruction multiple-data predicate compare operation, said method comprising the steps of:
    performing an element by element predicate comparison using a first vector register having one or more elements to a second vector register having one or more elements for a specified single-instruction multiple-data predicate compare operation;
    summarizing said specified single-instruction multiple-data predicate compare operation as a two status bit result having a first status bit and a second status bit; and
    storing said two status bit result in a status register for supporting control flow when performing said specified single-instruction multiple-data predicate compare operation.

2. The method according to claim 1, wherein summarizing said specified single-instruction multiple-data predicate compare operation further includes the step of:
    setting said first status bit of said two status bit result when all said element by element predicate comparisons give a false result.

3. The method according to claim 1, wherein summarizing said specified single-instruction multiple-data predicate compare operation further includes the step of:
    setting said second status bit of said two status bit result when all element by element predicate comparisons give a true result.

4. The method according to claim 1, wherein summarizing said specified single-instruction multiple-data predicate compare operation further includes the step of:
    setting said first status bit of said two status bit result when all said element by element predicate comparisons are inputted into a "NOR" gate resulting in an output of all zeros.

5. The method according to claim 1, wherein summarizing said specified single-instruction multiple-data predicate compare operation further includes the step of:
    setting said second status bit of said two status bit result when all said element by element predicate comparisons are inputted into an "AND" gate resulting in an output of all ones.

6. The method according to claim 1, wherein performing said element by element predicate comparison using said first vector register to said second vector register for said specified single-instruction multiple-data predicate compare operation, further includes the step of:
    placing a result for each said element by element predicate comparison in a respective target vector register.

7. The method according to claim 1, wherein performing said element by element predicate comparison said specified single-instruction multiple-data predicate compare operation, further includes the step of:
    specifying a predicate compare operation comprising of the group of, is greater than, is less than and is equal to.

8. The method according to claim 1, wherein summarizing said specified single-instruction multiple-data predicate compare operation as said two status bit result, further includes the step of:
    expressing said two status bit result as a two bit digital representation "0b10" when none of said element by element predicate comparison satisfies said predicate compare operation.

9. The method according to claim 1, wherein summarizing said specified single-instruction multiple-data predicate compare operation as said two status bit result, further includes the step of:
    expressing said two status bit result as a two bit digital representation "0b00" when some of said element by element predicate comparison satisfies said predicate compare operation.

10. The method according to claim 1, wherein summarizing said specified single-instruction multiple-data predicate compare operation as said two status bit result, further includes the step of:
    expressing said two status bit result as a two bit digital representation "0b01" when all of said element by element predicate comparison satisfies said predicate compare operation.

11. An information handling system comprising:
    means for performing an element by element predicate comparison using a first vector register having one or more elements to a second vector register having one or more elements for a specified single-instruction multiple-data predicate compare operation;
    means for summarizing said specified single-instruction multiple-data predicate compare operation as a two status bit result having a first status bit and a second status bit;
    means for setting said first status bit of said two status bit result when all said element by element predicate comparisons are inputted into a "NOR" gate resulting in an output of all zeros;
    means for setting said second status bit of said two status bit result when all said element by element predicate comparisons are inputted into an "AND" gate resulting in an output of all ones; and
    means for storing said two status bit result in a status register for supporting control flow when performing said specified single-instruction multiple-data predicate compare operation.

12. The information handling system according to claim 11, further comprising:
    means for setting said first status bit of said two status bit result when all said element by element predicate comparisons give a false result.

13. The information handling system according to claim 11, further comprising:
    means for setting said second status bit of said two status bit result when all element by element predicate comparisons give a true result.

14. The information handling system according to claim 11, further comprising:
    means for placing a result for each said element by element predicate comparison in a respective target vector register.

15. The information handling system according to claim 11, further comprising:
    means for specifying a predicate compare operation comprising of the group of, is greater than, is less than and is equal to.

16. The information handling system according to claim 11, further comprising:

means for expressing said two status bit result as a two bit digital representation "0b10" when none of said element by element predicate comparison satisfies said predicate compare operation.

17. The information handling system according to claim 11, further comprising:

means for expressing said two status bit result as a two bit digital representation "0b00" when some of said element by element predicate comparison satisfies said predicate compare operation.

18. The information handling system according to claim 11, further comprising:

means for expressing said two status bit result as a two bit digital representation "0b10" when all of said element by element predicate comparison satisfies said predicate compare operation.

19. A computer program product residing on a computer usable medium for providing a result code for a single-instruction multiple-data predicate compare operation, comprising:

instruction means for performing an element by element predicate comparison using a first vector register having one or more elements to a second vector register having one or more elements for a specified single-instruction multiple-data predicate compare operation;

instruction means for summarizing said specified single-instruction multiple-data predicate compare operation as a two status bit result having a first status bit and a second status bit and placing a result for each said element by element predicate comparison in a respective target vector register;

instruction means for setting said first status bit of said two status bit result when all said element by element predicate comparisons are inputted into a "NOR" gate resulting in an output of all zeros;

instruction means for setting said second status bit of said two status bit result when all said element by element predicate comparisons are inputted into an "AND" gate resulting in an output of all ones; and instruction means for storing said two status bit result in a status register for supporting control flow when performing said specified single-instruction multiple-data predicate compare operation.

20. The computer program product according to claim 19, further comprising:

instruction means for expressing said two status bit result as a two bit digital representation "0b10" when none of said element by element predicate comparison satisfies said predicate compare operation;

instruction means for expressing said two status bit result as a two bit digital representation "0b00" when some of said element by element predicate comparison satisfies said predicate compare operation; and instruction means for expressing said two status bit result as a two bit digital representation "0b01" when all of said element by element predicate comparison satisfies said predicate compare operation.

* * * * *

UNITED STATES PATENT AND TRADEMARK OFFICE
CERTIFICATE OF CORRECTION

PATENT NO. : 6,282,628 B1
DATED : August 28, 2001
INVENTOR(S) : Pradeep Kumar Dubey et al.

It is certified that error appears in the above-identified patent and that said Letters Patent is hereby corrected as shown below:

<u>Title page,</u>
Item [73], please add the Assignees -- Apple Computer, Inc., Cupertino, California; and Motorola, Inc., Schamburg, Illinois --.

Signed and Sealed this

Twenty-sixth Day of November, 2002

*Attest:*

JAMES E. ROGAN
*Attesting Officer*     *Director of the United States Patent and Trademark Office*